United States Patent
You et al.

(10) Patent No.: US 11,543,073 B2
(45) Date of Patent: Jan. 3, 2023

(54) MONITOR ARM WITH DECORATIVE LIGHTING

(71) Applicant: NINGBO TUOTUO RIVER DESIGN COMPANY, Zhejiang (CN)

(72) Inventors: Xiaodong You, Ningbo (CN); Xiangyang Chen, Ningbo (CN)

(73) Assignee: NINGBO TUOTUO RIVER DESIGN COMPANY, Zhejiang (CN)

(*) Notice: Subject to any disclaimer, the term of this patent is extended or adjusted under 35 U.S.C. 154(b) by 69 days.

(21) Appl. No.: 17/197,792

(22) Filed: Mar. 10, 2021

(65) Prior Publication Data
US 2022/0290802 A1     Sep. 15, 2022

(51) Int. Cl.
| F16M 11/00 | (2006.01) |
| F16M 11/20 | (2006.01) |
| G06F 1/16 | (2006.01) |
| F16M 13/02 | (2006.01) |

(52) U.S. Cl.
CPC ....... *F16M 11/2064* (2013.01); *G06F 1/1607* (2013.01); *F16M 13/022* (2013.01); *F16M 2200/044* (2013.01); *F16M 2200/065* (2013.01); *F16M 2200/068* (2013.01)

(58) Field of Classification Search
None
See application file for complete search history.

(56) References Cited

U.S. PATENT DOCUMENTS

| 6,409,134 | B1* | 6/2002 | Oddsen, Jr. | F16M 11/10 248/282.1 |
| 6,736,364 | B2* | 5/2004 | Oddsen, Jr. | F16M 11/2014 248/278.1 |
| D631,052 | S | 1/2011 | Hung | |
| 8,162,271 | B2* | 4/2012 | Li | F16M 11/2064 248/162.1 |
| 8,310,468 | B2* | 11/2012 | Martin | F16M 11/2014 345/204 |
| 8,366,060 | B2* | 2/2013 | Hung | F16M 13/022 248/278.1 |
| 8,469,323 | B1* | 6/2013 | Deros | F16M 11/105 248/124.2 |
| 8,888,696 | B2* | 11/2014 | Marka | F21V 21/30 362/249.11 |
| D745,873 | S | 12/2015 | Xiang et al. | |

(Continued)

FOREIGN PATENT DOCUMENTS

| EM | RCD 002605014-0001 | 12/2014 |
| EM | RCD 003400050-0001 | 9/2016 |

(Continued)

*Primary Examiner* — Steven M Marsh
(74) *Attorney, Agent, or Firm* — Knobbe Martens Olson & Bear LLP (57) ABSTRACT

A monitor arm with decorative lighting (or luminous display arm) includes a light-emitting element and a wire that is connected to the light-emitting element. The light-emitting element and the wire are routed through an inside cavity of the arm. A conductive slip ring is disposed inside a connecting joint of the arm to facilitate electrical connection of the wire. The monitor arm with decorative lighting includes wiring arranged inside a cavity of the arm so as to not be visible from the exterior providing additional safety and organization for wires and a clean outward appearance.

10 Claims, 13 Drawing Sheets

(56) References Cited

U.S. PATENT DOCUMENTS

| | | |
|---|---|---|
| 9,657,889 B1 | 5/2017 | Chumakov |
| 9,706,843 B2 * | 7/2017 | Hung ................ F16M 11/2064 |
| D798,848 S | 10/2017 | Frank |
| D822,671 S | 7/2018 | Chu |
| D847,823 S | 5/2019 | Monsalve et al. |
| D849,013 S | 5/2019 | Monsalve et al. |
| D875,105 S | 2/2020 | Xiang et al. |
| D877,744 S | 3/2020 | Xiang et al. |
| D918,218 S | 5/2021 | Lyu |
| D919,631 S | 5/2021 | Shu |
| D922,394 S | 6/2021 | Lu |
| D928,793 S | 8/2021 | Shu |
| 2011/0147546 A1 | 6/2011 | Monsalve |
| 2011/0260017 A1 | 10/2011 | Monsalve |
| 2011/0303805 A1 | 12/2011 | Lau |
| 2011/0315843 A1 | 12/2011 | Hung |

FOREIGN PATENT DOCUMENTS

| | | |
|---|---|---|
| EM | RCD 005665445-0001 | 9/2018 |
| EM | RCD 006592861-0001 | 6/2019 |
| EM | RCD 007033238-0001 | 10/2019 |
| EM | RCD 008262984-0004 | 11/2020 |

\* cited by examiner

MONITOR ARM WITH DECORATIVE LIGHTING

BACKGROUND

Field

Embodiments described in the application relate to a monitor or display arm, and more particularly, to a luminous display arm or monitor arm with decorative lighting.

Description of the Related Art

At present, available luminous display arms are provided with light-emitting elements on an upper arm or the base assembly that connect to wires and controlled by the remote control.

However, these conventional luminous display arms have wires exposed outside of the arm structure so that the wires must wrap around the arm which can impede arm movement or break when the display arm is pivoted. Therefore, using the conventional luminous display during pivoting requires more effort from the user, is time-consuming, and fails.

SUMMARY

To overcome these and other shortcomings, the present application provides a monitor arm with decorative lighting or luminous display arm for displays such as televisions and computer monitor that has the capability of easily and conveniently managing the connecting wires in a hidden way. In some embodiments, the wires will not be wrapped around or break when the display arm is pivoted.

The monitor arms with decorative lighting described herein can include one or more of the following features as well as other features described throughout this application. Those features mentioned in this summary are provided by way of example and should not be construed as limiting of the disclosure.

In some embodiments, a monitor arm with decorative lighting comprises a light-emitting element and a wire that is connected the light-emitting element. The light-emitting elements and the wires can be disposed throughout the inside cavity of the display arm, and the wires route through the arm assemblies provided with a conductive slip ring which is disposed inside the connecting joint. The conductive slip ring and the connecting joint can rotate and move respectively to each other.

In some embodiments, the display arm comprises an upper arm assembly, a lower arm assembly, and a base assembly. The upper arm assembly and the lower arm assembly are connected pivotally with each other about the first connecting joint, and the lower arm assembly and the base assembly are connected pivotally with each other about the second connecting joint. The conductive slip ring can be disposed inside the first connecting joint and/or second connecting joint.

In some embodiments, the second connecting joint further has a rotation stopper system. The rotation stopper system can comprise a limiting block and a limiting groove. The limiting groove can be disposed on the any one of the lower arm assembly and the base assembly and/or the limiting block can be disposed on the any one of the lower arm assembly and the base assembly.

In some embodiments, the display arm comprises single arm assembly and the base assembly. The arm assembly can be attached pivotally to the base assembly about the connecting joint that includes conductive slip ring.

In some embodiments, the light-emitting elements further comprise an upper arm accent lighting, a lower arm accent lighting and a base accent lighting. The light-emitting elements can be disposed on any one or any two or any three of the upper arm assembly, the lower arm assembly, and the base assembly.

In some embodiments, the connecting joint has a connecting mechanism. The connecting mechanism can comprise a pivotal tube and a pivotal post that can be engaged in the pivotal tube. The pivotal tube can be formed on one of the two connecting parts, and the pivotal post is formed on another of the two connecting parts. The pivotal tube can be disposed with an installation hole, and the pivotal post can include an annular groove defined around the pivotal post. A fastener screwed into the pivotal tube through the installation hole and is held slidably in the annular groove in the pivotal post.

In some embodiments, the display arm comprises a controller that is connected to the light-emitting elements.

In some embodiments, the controller can be in the form of Wi-Fi control, infrared control, a button control, a Bluetooth APP control, or others.

In some embodiments, the display arm comprises a light guide plate that is correspondingly disposed to the light-emitting elements.

In some embodiments, the light guide plate can be formed on the upper arm assembly, the lower arm assembly and/or the base assembly to direct the light out the front.

The display arm in the embodiments described herein can be provided with the light-emitting elements inside the display arm, therefore the corresponding wires cannot be seen from the outside and the wires will be not wrapped around the arm or break when the display arm is pivoted providing a clean look and improved convenience.

BRIEF DESCRIPTION OF THE DRAWINGS

The features and advantages of the display arms with decorative lighting and associated methods described herein will become more fully apparent from the following description and appended claims, taken in conjunction with the accompanying drawings. These drawings depict only several embodiments in accordance with the disclosure and are not to be considered limiting of its scope. In the drawings, similar reference numbers or symbols typically identify similar components, unless context dictates otherwise. The drawings may not be drawn to scale.

FIGS. 5-13 illustrate additional views of a monitor arm with decorative lighting in which:

DETAILED DESCRIPTION

Embodiments of the present inventive concepts will be described more fully hereinafter with reference to the accompanying drawings, in which exemplary embodiments of the invention(s) described herein are shown. These embodiments are illustrative and should not be construed as limiting.

Figure 1:
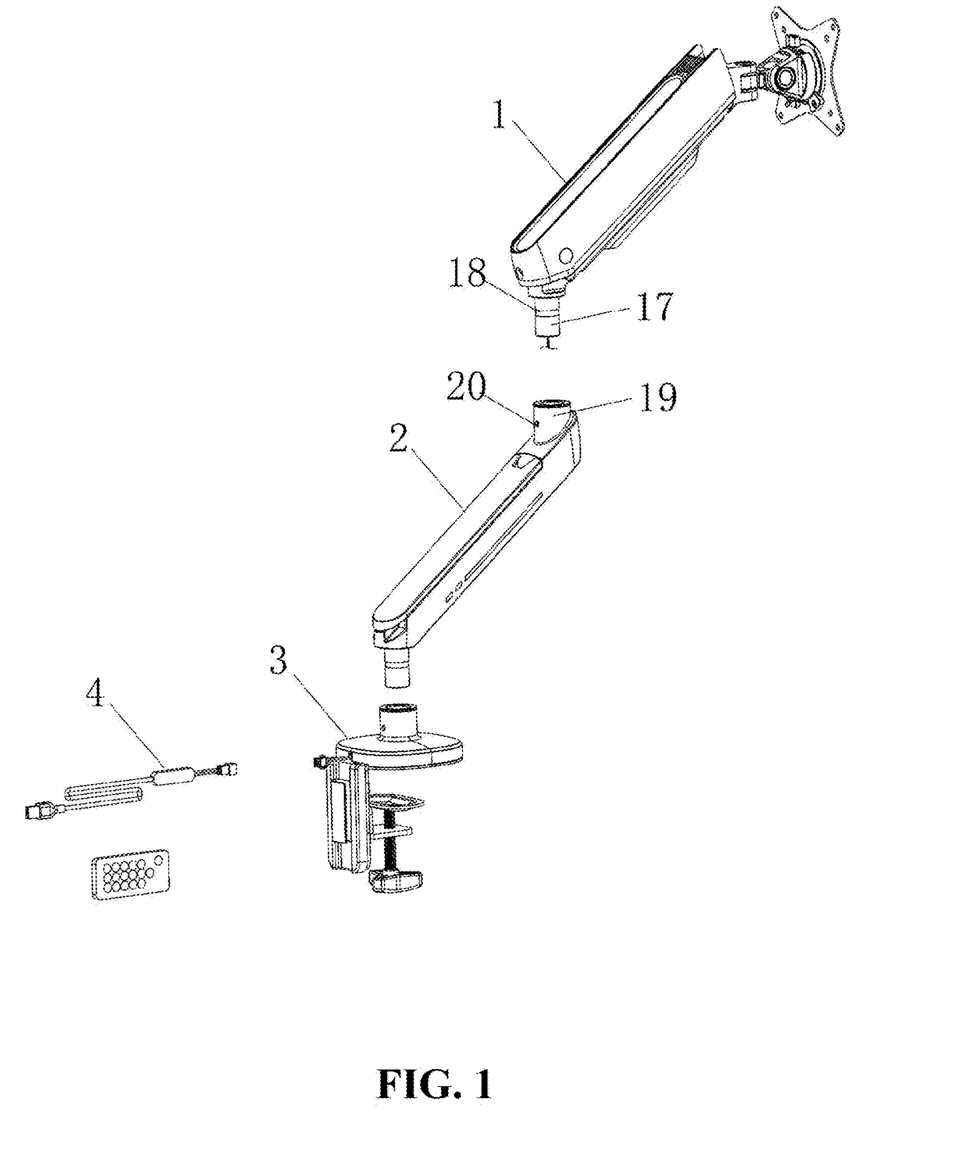
FIG. 1 is an exploded view of an embodiment of a monitor arm with decorative lighting or a luminous display arm.
Figure 2:
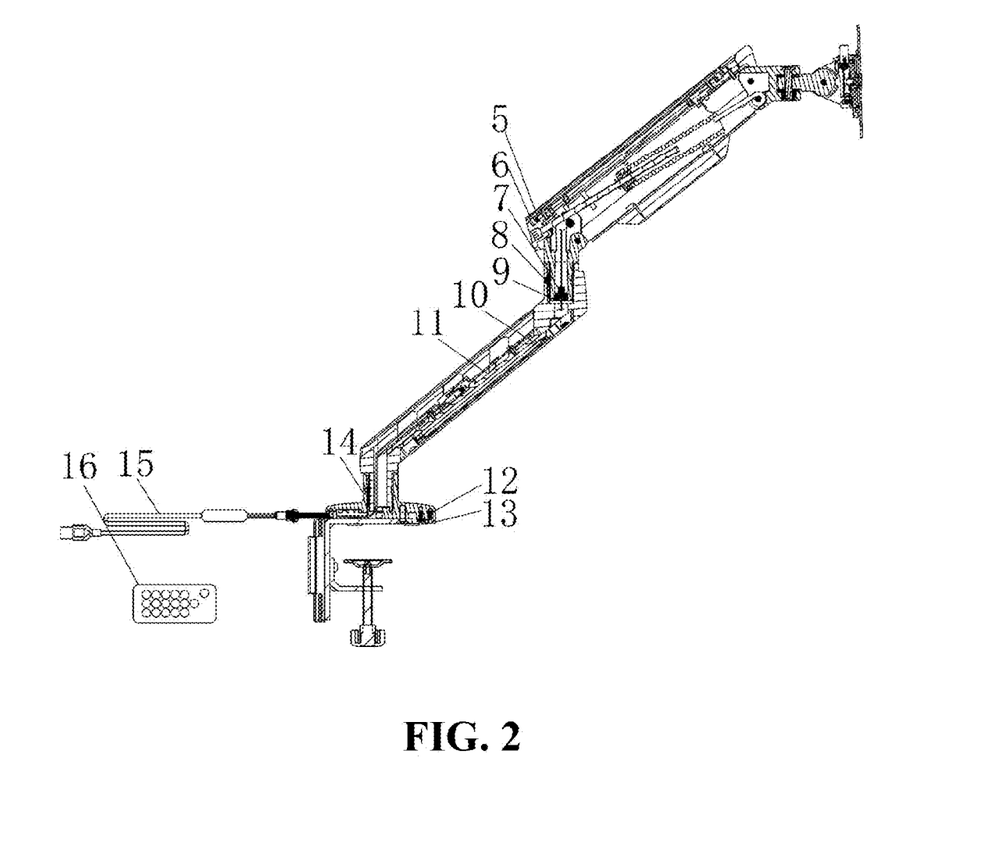
FIG. 2 is a side section view of the luminous display arm.
Figure 3:
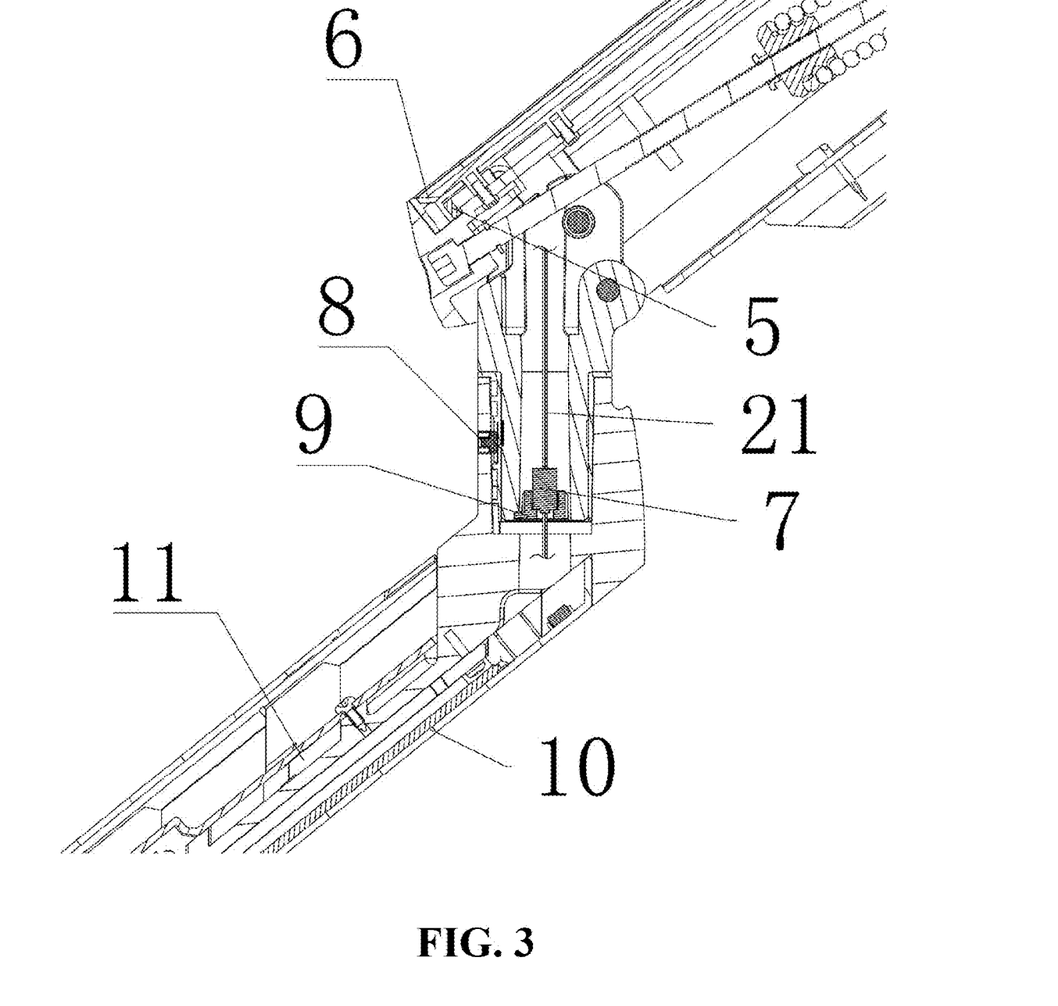
FIG. 3 is an enlarged side view in partial section of the connecting mechanism in FIG. 2.

Referring to FIGS. 1-3, a luminous display arm in accordance with the present application is shown. In the illustrated embodiment, the luminous display arm comprises an upper arm assembly 1, a lower arm assembly 2, a base assembly 3 and a controller assembly 4. The upper arm assembly 1 and the lower arm assembly 2 are connected pivotally with each other about a first connecting joint, such that the relative angle/position between the arms can be adjusted at 360 degrees The lower arm assembly 2 is attached pivotally to the base assembly 3 about a second connecting joint. The base assembly 3 is mounted securely to fix the display arm, and the controller assembly 4 is provided to control the light-emitting elements for light switching and a plurality of light outputs.

In the embodiment illustrated, the light-emitting elements and the corresponding wires are arranged inside the display arm, so that the corresponding wires cannot be seen from the outside. Hereinafter, the display arm will be described with the light-emitting elements that are disposed inside both the upper arm assembly, the lower arm assembly, and the base assembly.

Referring to FIGS. 2-3, the light-emitting elements in the embodiment comprise the upper arm accent lighting 5, the lower arm accent lighting 10, and the base accent lighting 12. The upper arm accent lighting 5 can be attached inside the upper arm assembly 1 with the back glue or by other mechanisms, the lower arm accent lighting 10 can be attached inside the lower arm assembly 2 with the back glue or other mechanisms. The base accent lighting can be arranged inside the base assembly. The upper arm accent lighting 5, the lower arm accent lighting 10 and the base accent lighting 12 are connected aligned through a wire 21.

In the embodiment illustrated, the light-emitting elements are disposed both inside the upper arm assembly, the lower arm assembly, and the base assembly, and the light-emitting elements may be disposed in any one or any two of the upper arm assembly, the lower assembly, and the base assembly.

Referring to FIGS. 2-3, the wires 21 in the embodiment are disposed inside the display arm, indicating the wires are arranged throughout inside the cavity of the upper arm assembly, the lower arm assembly, and the base assembly to connect the light-emitting elements. Additionally, the wires route through the upper arm assembly and the lower arm assembly is provided with a conductive slip ring 7 which is disposed inside the first connecting joint, the conductive slip ring and the first connecting joint can rotate and move respectively to each other.

The display arm can include dual arm assemblies such as the upper arm assembly and lower arm assembly. The upper arm assembly and the lower arm assembly are connected pivotally with each other about the connecting joint. In some embodiments, the display arm can be provided with only one arm assembly, and the arm assembly is attached pivotally to the base assembly about the connecting joint wherein the conductive slip ring is arranged.

The conductive slip ring in the embodiment illustrated is disposed inside the first connecting joint. In some embodiments, the conductive slip ring can be disposed inside the second connecting joint.

A conventionally used conductive slip ring may be selected for the embodiment illustrated, but not to the exclusion of any other type of conductive slip ring. A specific configuration of an inventive conductive slip ring will be described hereinafter. Referring to the FIG. 3, the conductive slip ring 7 in the embodiment is engaged with a holding base 9 which can be inserted into the cavity of the connecting joint. Therefore, the conductive slip ring 7 can be fixed in certain position inside the display arm. The conductive slip ring 7 and the holding base 9 can rotate and move respectively to each other, the conductive slip ring 7 generally can comprises an outer ring and an inner ring. The outer ring and inner ring can rotate and move respectively to each other. Two of the wires 21 are respectively attached to the two ends of the conductive slip ring. The first wire connects the upper arm accent lighting 5 and the conductive needle on the upper end of the conductive slip ring 7, the second wire connects the lower arm accent lighting 10 and the conductive needle on the lower end of the conductive slip ring 7. The outer ring and inner ring therefore can rotate and move respectively to each other to ensure that the wires will not get wrapped around or broken.

The conductive slip ring 7 in the embodiment illustrated can be in a cylindrical profile, and the holding base 9 can feature a cylindrical cavity corresponding to the conductive slip ring, but not the exclusion of any other type of conductive slip ring.

Referring to FIGS. 1-2, a controller 15 and a remote control 16 in the embodiment illustrated are provided to control the light-emitting elements for light switching and a plurality of light outputs. The wires of the base accent lighting 12 can be connected to the end that with a plug of the controller after routing round the groove under the base assembly and passing through the notch at the rear of the base assembly. The other end that with a USB plug of the controller 15 can be connected to the power supply. The remote control 16 is provided for light switching and a plurality of light outputs of the upper arm accent lighting 5, lower arm accent lighting 10, and the base accent lighting 12.

The light-emitting elements can be a lighting strip or a lamp bead in various embodiments. The controller in the embodiment illustrated can be in the form of Wi-Fi control, infrared control, button control, or Bluetooth APP control, or others. For example, the remote control can be omitted, and the controller with Wi-Fi receiver can be used to control the light via mobile APP. In some cases, the remote control can be omitted, and the control buttons are formed on the base or the controller to control the light directly.

In addition, the upper arm accent lighting 5 is correspondingly provided with the upper arm light guide plate 6, the lower arm accent lighting 10 is correspondingly provided with lower arm light guide plate 11, the base accent lighting is correspondingly provided with the base light guide plate 13; and the light guide plates are engaged in the corresponding arm assemblies to direct the light out the front. In the embodiment illustrated, the upper arm accent lighting is directly disposed on the upper arm. In some embodiments, the upper arm accent lighting can be directly disposed beneath the upper arm. In the embodiment illustrated, the lower arm accent lighting is disposed on both sides of the lower arm. In some embodiments, the lower arm accent lighting can be directly disposed on or beneath the lower arm. In the embodiment illustrated, the base accent lighting is disposed on the side of the base assembly. In some embodiments, the base accent lighting can be disposed on the base assembly or one side of the base assembly.

Referring to FIGS. 1-3, the first connecting joint and/or the second connecting joint in the embodiment illustrated feature a connecting mechanism. The connecting mechanism of the first connecting joint will be described in detail as an example hereinafter. The connecting mechanism comprises a pivotal tube 19 and a pivotal post 17, the pivotal post 17 is formed on and protrudes from the lower connecting end of the upper arm assembly and has an annular groove 18 defined around the pivotal post 17. The pivotal tube is correspondingly formed on and protrudes from the upper connecting end of the lower arm assembly. The pivotal tube 19 is formed on and protrudes from the upper connecting end of the lower arm assembly. A fastener 8 screwed into the pivotal tube 19 through an installation hole 20 and is held slidably in the annular groove 18 in the pivotal post 17 to pivotally connect the upper arm assembly with the lower arm assembly.

For the second connecting joint, the fastener 14 screwed into the pivotal tube formed on the base assembly through another installation hole and is held slidably in the annular groove in the pivotal post formed on and protrudes from the lower connecting end of the lower arm assembly to pivotally connect the lower arm assembly with the base assembly.

Figure 4:
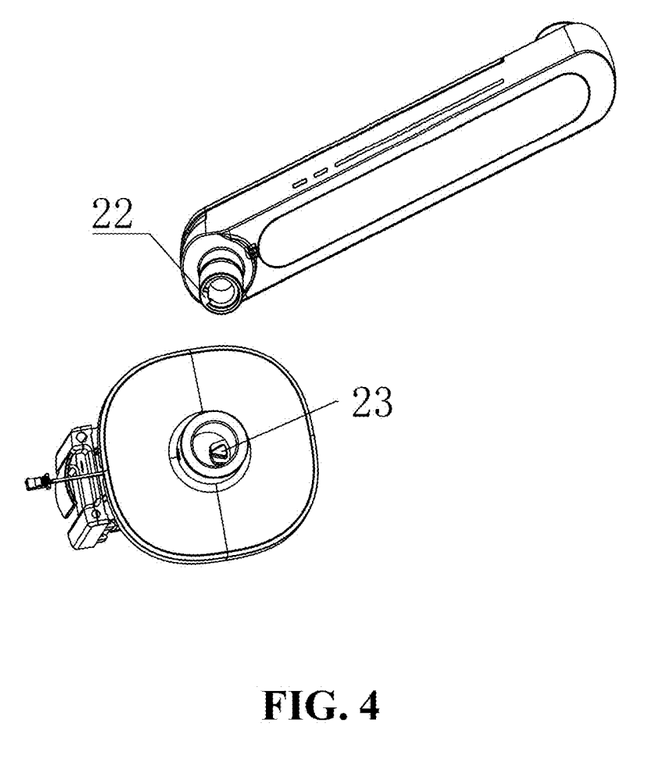
FIG. 4 is a top exploded view of the rotation stopper system.

Referring to FIG. 4, the second connecting mechanism has a rotation stopper system. The rotation stopper system comprises a limiting block 23 and a limiting groove 22. The limiting block 23 is disposed inside the base assembly bottom and the limiting groove 22 is correspondingly formed on the edge that alongside the pivotal post on the lower arm assembly. The rotation stopper system is provided to prevent further rotation of the displays.

The luminous display arm in the embodiments illustrated is provided with light-emitting elements inside the display arm, therefore the corresponding wires cannot be seen from the outside and the wires will not be wrapped around the arm or break when the display arm is pivoted providing a clean look and improved convenience.

Figure 5:
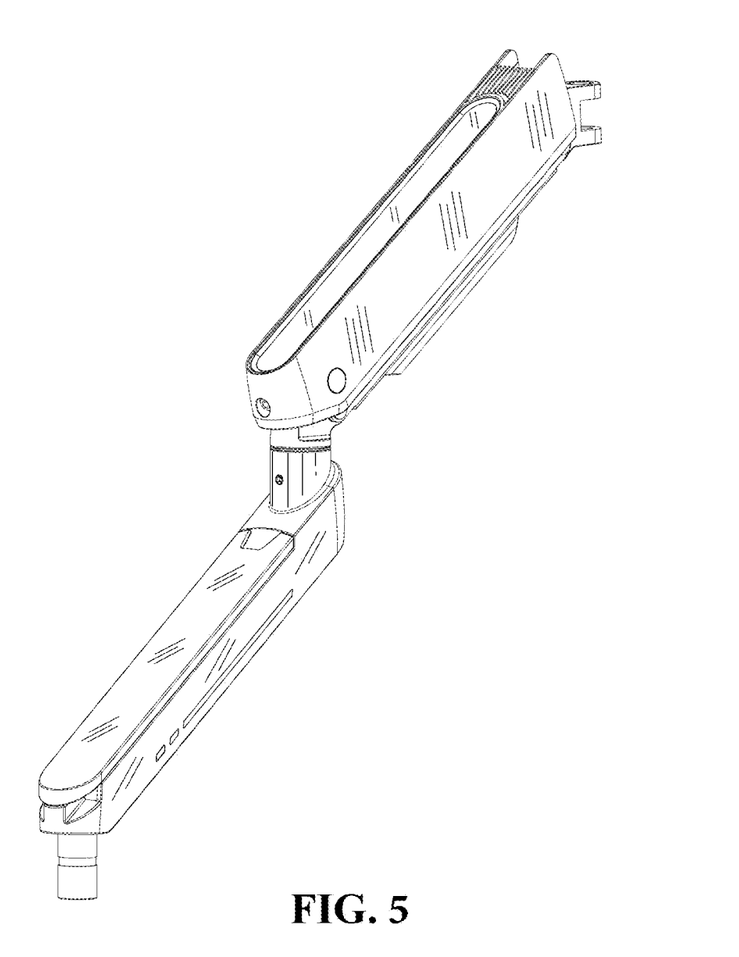
FIG. 5 is a first perspective view thereof.
Figure 6:
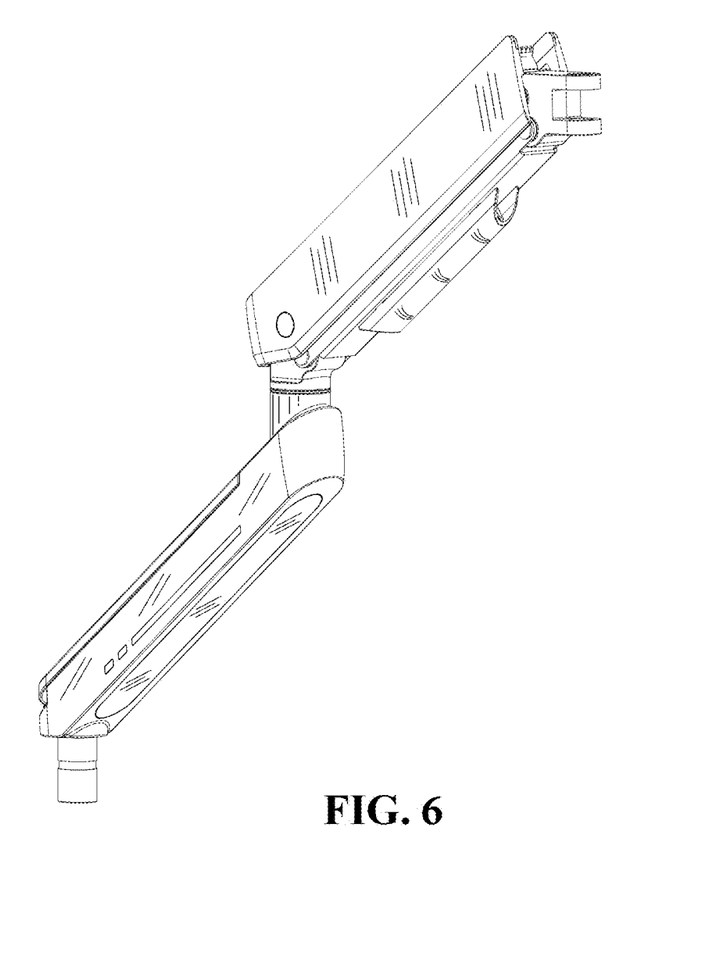
FIG. 6 is a second perspective view thereof.
Figure 7:
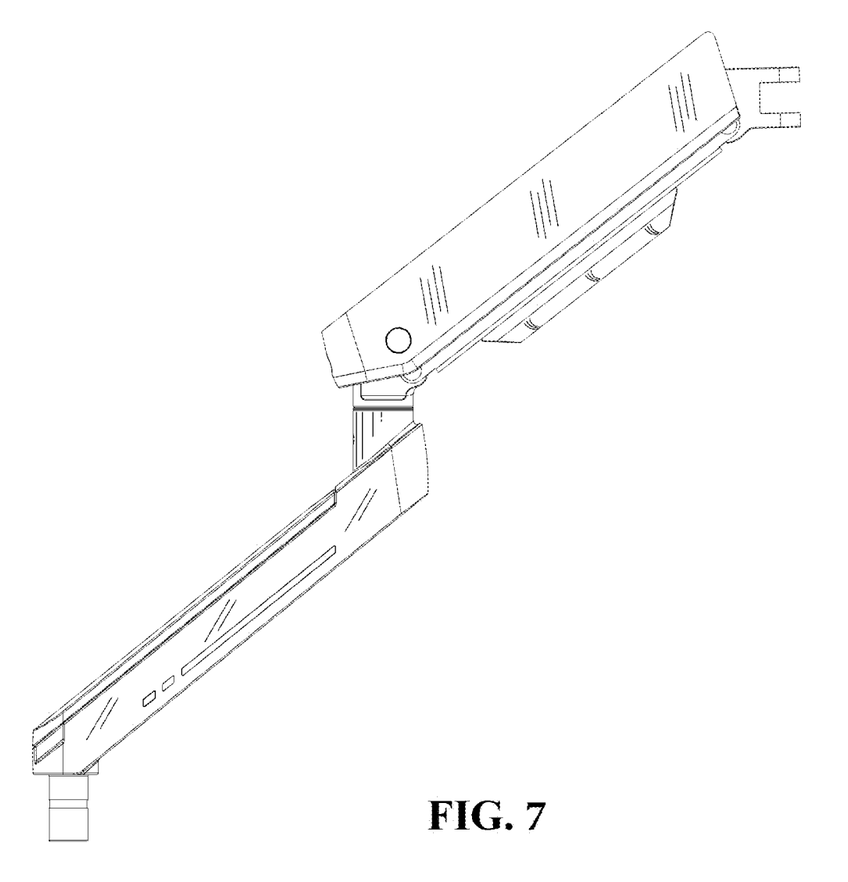
FIG. 7 is a left side view thereof.
Figure 8:
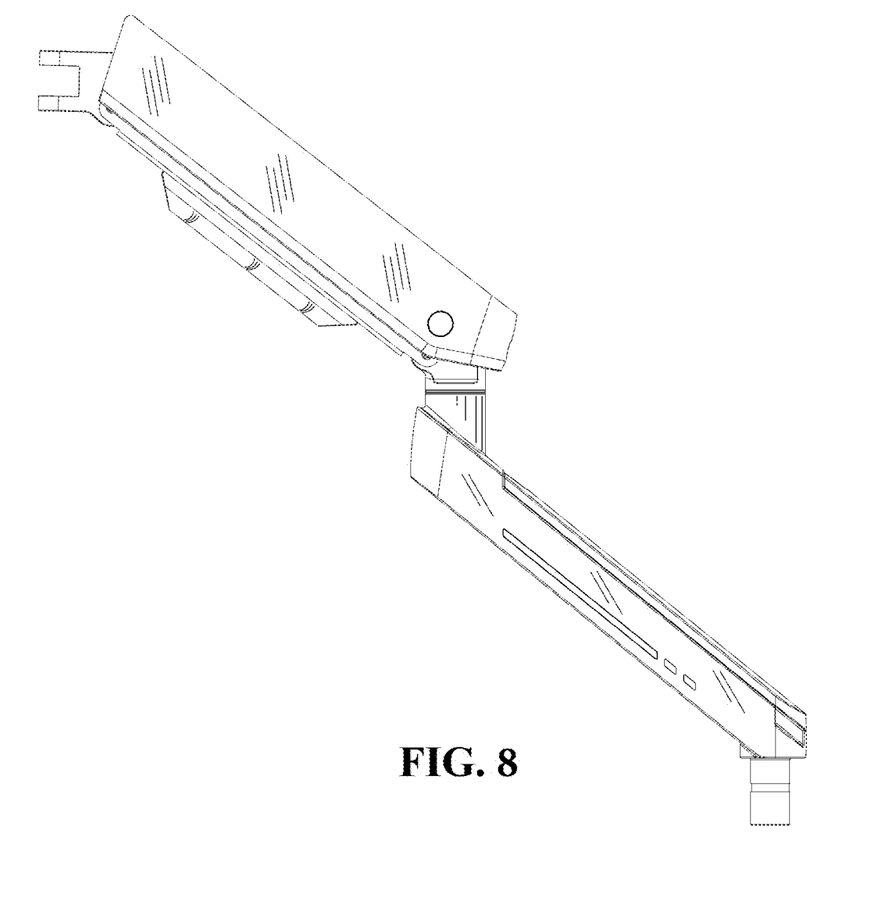
FIG. 8 is a right side view thereof.
Figure 9:
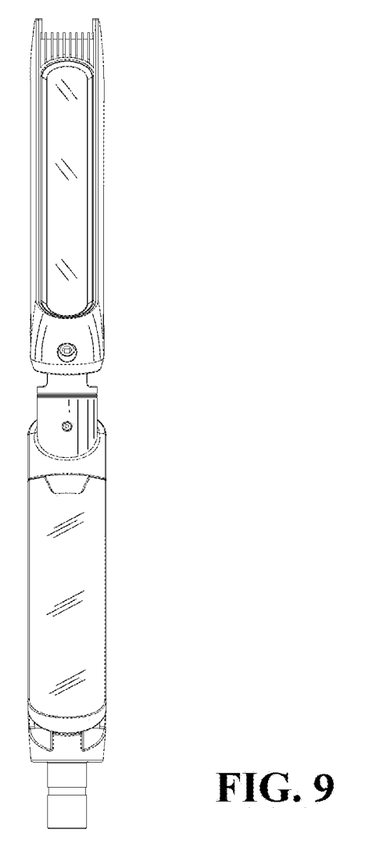
FIG. 9 is a back view thereof.
Figure 10:
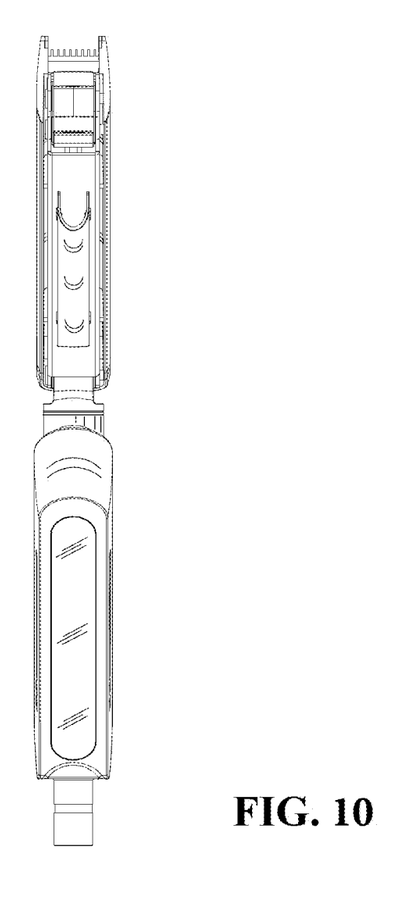
FIG. 10 is a front view thereof.
Figure 11:
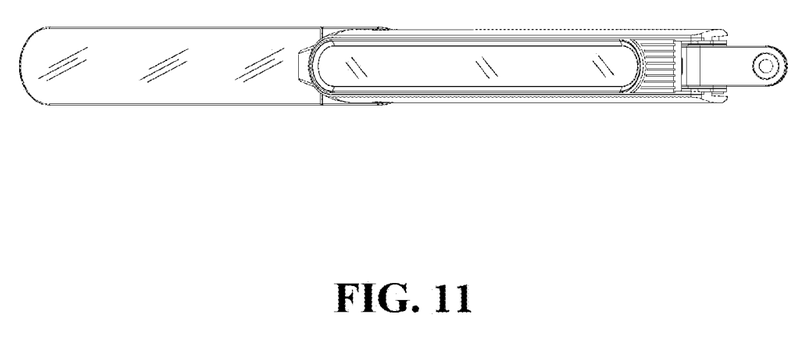
FIG. 11 is a top view thereof.
Figure 12:
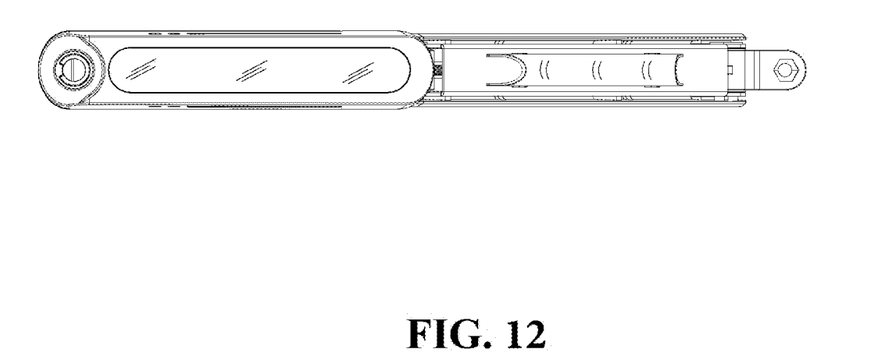
FIG. 12 is a bottom view thereof.
Figure 13:
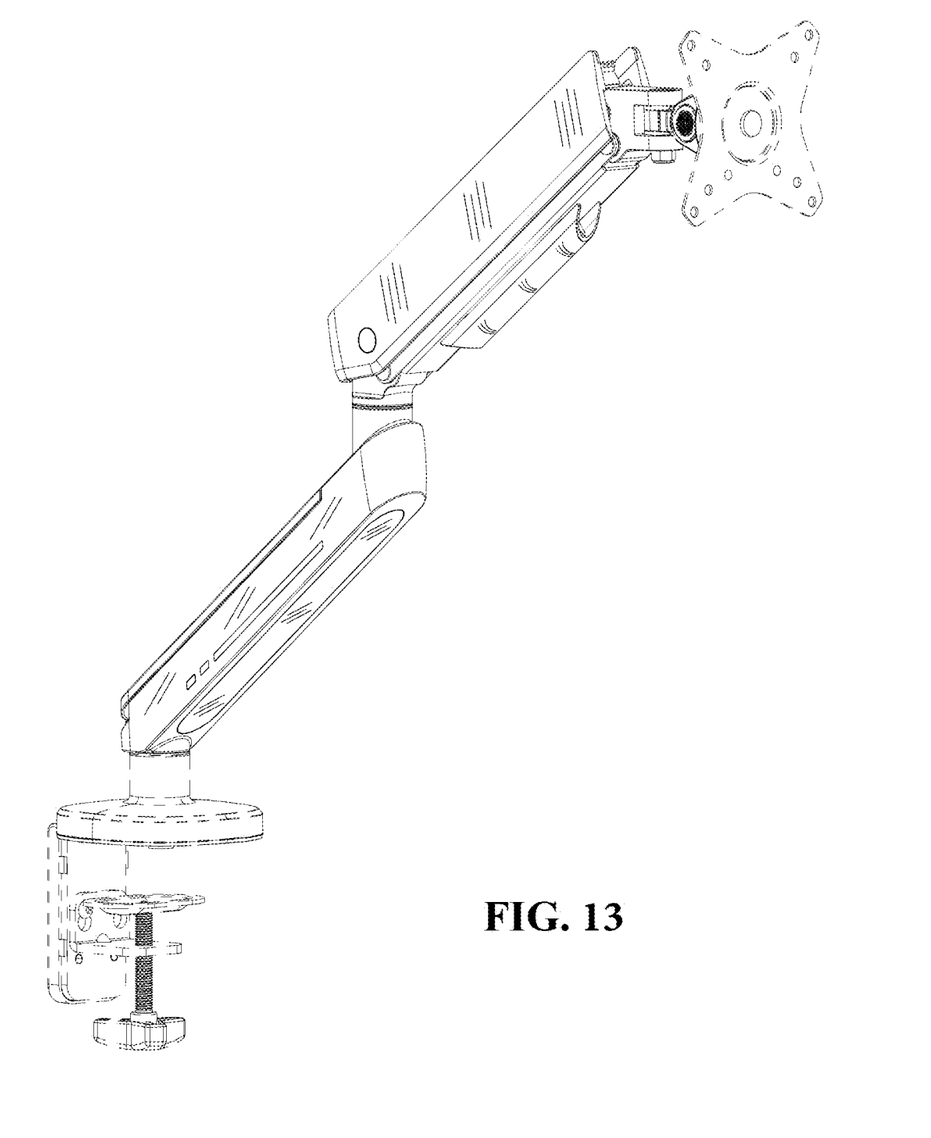
FIG. 13 is a perspective view thereof, illustrated with example monitor and desk attachment mechanisms shown in dashed lines.

FIGS. 5-13 illustrate additional views of a monitor arm with decorative lighting in which: FIG. 5 is a first perspective view thereof; FIG. 6 is a second perspective view thereof; FIG. 7 is a left side view thereof; FIG. 8 is a right side view thereof; FIG. 9 is a back view thereof; FIG. 10 is a front view thereof; FIG. 11 is a top view thereof; FIG. 12 is a bottom view thereof; and FIG. 13 is a perspective view thereof, illustrated with example monitor and desk attachment mechanisms shown in dashed lines.

Although particular embodiments of the invention(s) has been described in detail for purposes of illustration, various modifications and enhancements may be made without departing from the spirit and scope of the invention. Accordingly, the invention is not to be limited except as by the appended claims.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the figures may be combined, interchanged or excluded from other embodiments.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims. Applicant reserves the right to submit claims directed to combinations and sub-combinations of the disclosed inventions that are believed to be novel and non-obvious. Inventions embodied in other combinations and sub-combinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

What is claimed is:

1. A monitor arm with decorative lighting, comprising:
one or more light-emitting elements; and
a wire that is connected to at least one of the light-emitting elements,
wherein the at least one of the light-emitting elements and the wire are disposed in an inside cavity of the arm, the wire routes through a connecting joint of the arm through a conductive slip ring which is disposed inside the connecting joint, and the conductive slip ring and the connecting joint can rotate and move respectively to each other.

2. The arm of claim 1, wherein:
the arm comprises an upper arm assembly, a lower arm assembly, and a base assembly;
the upper arm assembly and the lower arm assembly are connected pivotally to each other about a first connecting joint;
the lower arm assembly and the base assembly are connected pivotally to each other about a second connecting joint; and
the conductive slip ring can be disposed inside the at least one of the first connecting joint or second connecting joint.

3. The arm of claim 2, wherein:
the second connecting joint further comprises a rotation stopper system;
the rotation stopper system comprises a limiting block and a limiting groove; and
the limiting groove is disposed on the any one of the lower arm assembly and the base assembly.

4. The arm of claim 1, wherein the display arm comprises a single arm assembly and a base assembly, and the arm assembly is attached pivotally to the base assembly about the connecting joint that includes the conductive slip ring.

5. The arm of claim 1, wherein the one or more light-emitting elements comprise an upper arm accent lighting, a lower arm accent lighting, and a base accent lighting, and the one or more light-emitting elements are disposed on any one or any two or any three of the upper arm assembly, the lower arm assembly, and the base assembly.

6. The arm of claim 1, wherein:
the connecting joint has a connecting mechanism;
the connecting mechanism comprises a pivotal tube and a pivotal post engaged in the pivotal tube;
the pivotal tube includes an installation hole;
the pivotal post comprises an annular groove defined around the pivotal post; and
a fastener is screwed into the pivotal tube through the installation hole and is held slidably in the annular groove in the pivotal post.

7. The arm of claim 1, wherein the arm comprises a controller that is connected to the one or more light-emitting elements.

8. The arm of claim 7, wherein the controller comprises a Wi-Fi control, an infrared control, a button control, or a Bluetooth app control.

9. The arm of claim 1, wherein the arm comprises a light guide plate that is correspondingly disposed to the one or more light-emitting elements.

10. The arm of claim 9, wherein the light guide plate is formed on at least one of the upper arm assembly, the lower arm assembly or the base assembly to direct light.

\* \* \* \* \*